(12) United States Patent
Sabeti (10) Patent No.: US 9,976,610 B2
(45) Date of Patent: May 22, 2018

(54) WEAR OPTIMIZED PAD DESIGN

(71) Applicant: Bendix Spicer Foundation Brake LLC, Elyria, OH (US)

(72) Inventor: Manouchehr Sabeti, North Olmstead, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days. days.

(21) Appl. No.: 15/427,723

(22) Filed: Feb. 8, 2017

(65) Prior Publication Data

US 2017/0234384 A1 Aug. 17, 2017

Related U.S. Application Data

(63) Continuation-in-part of application No. 14/844,813, filed on Sep. 3, 2015, now Pat. No. 9,605,721.

(51) Int. Cl.
| | |
|---|---|
| *F16D 65/08* | (2006.01) |
| *F16D 65/092* | (2006.01) |
| *F16D 55/225* | (2006.01) |
| *F16D 65/095* | (2006.01) |
| *F16D 69/04* | (2006.01) |
| *F16D 65/00* | (2006.01) |
| *F16D 69/00* | (2006.01) |

(52) U.S. Cl.
CPC ......... *F16D 65/092* (2013.01); *F16D 55/225* (2013.01); *F16D 65/0012* (2013.01); *F16D 65/095* (2013.01); *F16D 69/0408* (2013.01); *F16D 2069/004* (2013.01); *F16D 2069/0441* (2013.01)

(58) Field of Classification Search
CPC ..... F16D 65/092; F16D 55/226; F16D 55/227
USPC .............................. 188/250 B, 250 E, 250 G
See application file for complete search history.

(56) References Cited

U.S. PATENT DOCUMENTS

| | | | |
|---|---|---|---|
| 2,926,757 A | 3/1960 | Armstrong | |
| 3,990,545 A | 11/1976 | Hoffmann et al. | |
| 4,031,986 A * | 6/1977 | Thompson | ............. B60T 1/065 188/106 F |
| 4,394,891 A | 7/1983 | Oshima | |
| 4,538,708 A * | 9/1985 | Seki | ...................... F16D 55/226 188/73.38 |

(Continued)

OTHER PUBLICATIONS

FMSI Brake Lining Databook, Friction Materials Standards Institute, Inc., 2000, (fourteen (14) pages).

(Continued)

*Primary Examiner* — Christopher P Schwartz
(74) *Attorney, Agent, or Firm* — Crowell & Moring LLP (57) ABSTRACT

A brake pad for a disc brake with decreased wear characteristics is provided. The brake pad is configured with the distribution of brake pad friction material weighted toward the radially outer region of the brake pad, with the lateral sides of the pad material being generally aligned with radial lines originating at the rotation axis of the brake disc of the disc brake. The brake pad friction material distribution results in decreased brake application pressure between the brake pad and the brake disc while obtaining the same braking force provided by a comparable generally rectangular brake pad, resulting in lower brake pad wear at the same braking force levels.

15 Claims, 7 Drawing Sheets

(56) References Cited

U.S. PATENT DOCUMENTS

| | | | | |
|---|---|---|---|---|
| 4,915,198 | A * | 4/1990 | Hirashita | F16D 55/227 |
| | | | | 188/205 R |
| 5,236,068 | A * | 8/1993 | Nagai | F16D 65/092 |
| | | | | 188/250 E |
| 5,284,227 | A * | 2/1994 | Pelfrey | B62L 1/005 |
| | | | | 188/250 B |
| 5,289,903 | A * | 3/1994 | Nagai | F16D 55/226 |
| | | | | 188/250 E |
| 6,119,828 | A | 9/2000 | Parsons | |
| 6,386,335 | B1 | 5/2002 | DiPonio | |
| 7,578,374 | B2 | 8/2009 | Takeo et al. | |
| 7,731,002 | B2 | 6/2010 | Haupt et al. | |
| 8,505,699 | B2 | 8/2013 | Kappagantu et al. | |
| 9,605,721 | B1 * | 3/2017 | Sabeti | F16D 55/225 |
| 2011/0073418 | A1 | 3/2011 | Kim | |
| 2011/0259686 | A1 | 10/2011 | Hattori et al. | |
| 2011/0290599 | A1 | 12/2011 | Vasel | |
| 2013/0133990 | A1 | 5/2013 | Suzuki et al. | |
| 2017/0146081 | A1 * | 5/2017 | Sabeti | F16D 65/092 |

OTHER PUBLICATIONS

International Search Report (PCT/ISA/220 & PCT/ISA/210) issued in PCT Application No. PCT/US16/49872, including Written Opinion (PCT/ISA/237) dated Oct. 4, 2016 (seven (7) pages).
International Preliminary Report on Patentability (PCT/IB/326 & PCT/IB/373), including Written Opinion (PCT/ISA/237) issued in PCT Application No. PCT/US2016/049872 dated Mar. 15, 2018 (five (5) pages).

* cited by examiner

WEAR OPTIMIZED PAD DESIGN

BACKGROUND AND SUMMARY OF THE INVENTION

This application is a Continuation-In-Part of application Ser. No. 14/844,813, now U.S. Pat. No. 9,605,721, the disclosure of which is incorporated herein in its entirety.

The present invention relates to disc brakes for vehicles, and in particular to brake pads in disc brakes, such as air-operated disc brakes utilized on commercial vehicles. Commercial vehicles in this context include vehicles having disc brakes substantially larger than typical automotive (i.e., passenger car) brakes, such as busses, trucks in class 5 and above, off-road utility vehicles such as construction equipment, a railroad vehicle, and aircraft.

Figure 1:
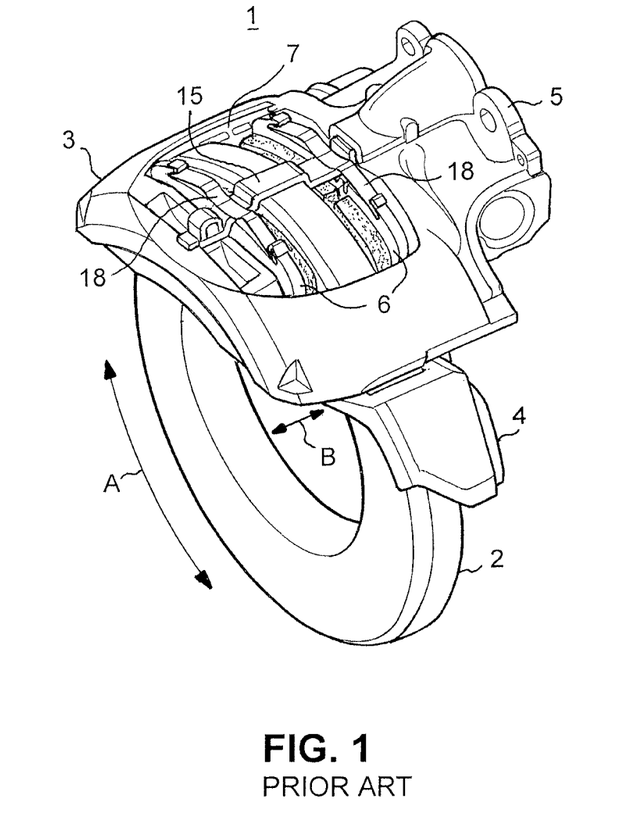
FIG. 1 is an oblique view of a disc brake.

An example of a commercial vehicle air-operated disc brake is shown in FIG. 1. In the FIG. 1 embodiment the disc brake 1 includes a brake disk 2 which rotates in direction A about its rotation axis B. A brake caliper 3 straddling the brake disk 2 is affixed to a carrier mount 4 which in turn is fixed to a vehicle axle, typically via a torque plate or a brake spider (not illustrated). In this embodiment the carrier mount 4 receives and supports both the caliper 3 and the brake pads 6. The caliper 3 is actuated in this embodiment by a pneumatic actuator (not illustrated) mounted at the actuator mounting face 5 of the caliper. The actuator acts upon a brake pad application mechanism contained within caliper 3 to press the brake pads 6 against the brake disk 2 to slow the vehicle. The present invention is not restricted to a particular type of brake actuator, for example, a pneumatic actuator or an electrically-driven actuator may be used. Nor is the invention limited to a particular type of brake caliper mount arrangement. For example, the brake caliper may be mounted in a fixed manner on a carrier or may be a sliding caliper.

Figure 4:
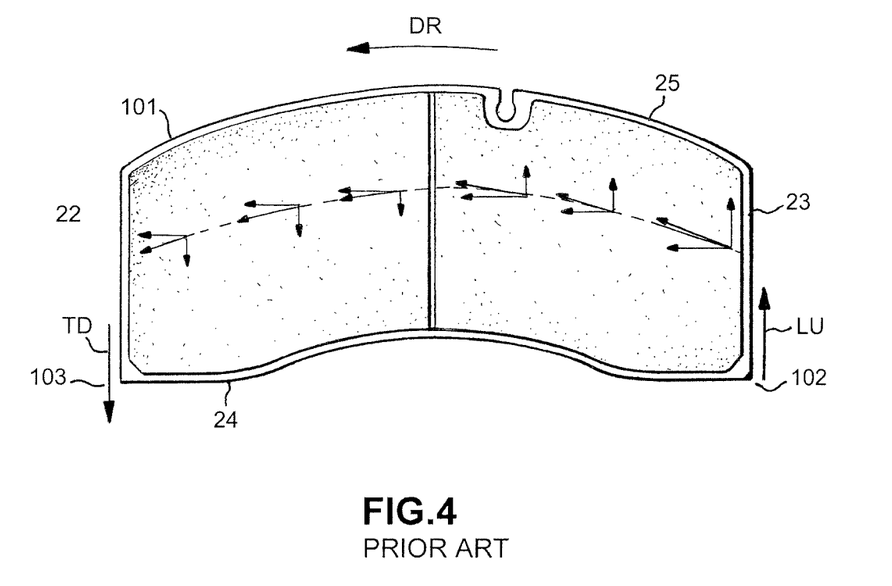
FIG. 4 is an elevation view of a known generally rectangular brake pad, annotated to illustrate pad motion in response to brake application.

In disc brake applications such as commercial vehicle disc brakes the brake pads typically have had a generally rectangular shape, in part due to the limitations on the size and configuration of the disc brake components (the disc brake having to exist within a highly-space constrained envelope provided by wheel rims), and in part due to cost and structural limitations discussed further below. An example of such a previous brake pad is shown in FIG. 4.

A common feature of a previous brake pad 20 is their having essentially parallel lateral sides 22, 23, i.e., the brake pad sides facing in the circumferential direction of the brake disc toward adjacent brake pad abutment surfaces are parallel to one another. The generally rectangular shape may include radially inner and radially outer sides of the brake pad 24, 25 that are slightly curved to generally follow the curvature of the brake disc as shown in FIG. 4, or in the case of the radially outer side, follow the shape of an adjacent outer region of the brake caliper. (not illustrated). The use of parallel lateral sides of the brake pad has in part been the de facto standard in commercial vehicle disc brakes in part due to practical manufacturing considerations (for example, less costly machining of brake pad abutment surfaces and parallel-sided brake pad backing plates) and in part due to structural reasons to ensure adequate brake pad abutment strength, wear, and braking force absorption performance.

With their generally rectangular shape, the previous commercial vehicle disc brake pads have presented to the brake disc essentially constant width and height profiles from one lateral side of the brake pad to the other. Such brake pad shapes have several disadvantages during brake operation. Among these is the fact that the specific braking energy transfer from the brake disc to the brake pad is not constant across the radial height of the brake pad. Instead, the energy transfer varies as a function of radial height relative to the rotation axis of the brake disc (i.e., braking torque varying as a function of the distance from the brake disc rotation axis, where force×distance=torque), and as a function of the length of the friction surface of the brake pad friction material at different radial heights. As a result, the energy transfer to the brake pad, and the resulting localized wear of the brake pad, is inconsistent across the face of the brake pad friction material. This can lead to premature wear of the friction material in some areas of the brake pad and thereby shorten the time before the brake pad must be replaced.

The present invention addresses this and other problems by providing a brake pad with more efficient and even braking energy transfer distribution across the face of the brake pad lining material. The approach of the present invention provides for more even pad lining material wear, thereby extending service life of the brake pad. The improved brake pad performance also enables reduction in overall brake size by allowing the use of smaller brake pads while still providing satisfactory braking performance.

In an embodiment of the present invention, the brake pad lining material, and preferably the brake pad backing plate carrying the lining material, has a generally arc-shaped profile, with the radially outer portion of the lining material having a width in the circumferential direction that is longer than the width of the lining material at the radially inner portion of the brake pad. Preferably, the width of the brake pad lining material as a function of radial distance from the brake disc rotation axis is established by generally aligning the lateral sides of the lining material along radial lines that intersect at or near the rotation axis of the brake disc. The lateral sides of the brake pad need not be exactly aligned with the radial lines from the rotation axis; rather the present invention contemplates the greatest lining material width at the radially outer region of the brake pad, while the width is smaller at the radially inner region of the lining material. The closer the intersection is to the center of the brake disc rotor, the more efficient the energy distribution at the pad-disc interface.

The present invention also includes variations in which the brake pad friction material still has a generally arc-shaped profile, but due to the requirements of a particular installation (for example, the dimensions of the particular brake caliper and/or caliper mount, or the thermal and wear performance needs of the application) the angle of lateral sides of the arc-shaped friction material and the backing plate are adjusted to suit. This may resulting result in the sides of the backing plate and friction material being arranged at an angle between the prior art's parallel lateral sides and the radii from the brake disc rotation axis. Thus, while a typical brake pad friction material included angle of a brake pad in accordance with the present invention may be approximately 60°, variations with angles on the order of 30° or 70° are envisioned, with corresponding adjustments to the arc lengths at the upper and lower regions of the brake pad.

Another further advantage of the present invention is that the reduced width in the radially inner region of the brake pad permits the abutment faces of the brake pad carrier and the lateral sides of the brake pad to meet along a line that is more nearly perpendicular to a radius from the rotation axis. This arrangement allows the transfer braking forces between the lateral side of the brake pad and pad abutment surface of the pad carrier at or nearly normal to the abutment line. This provides for more uniform distribution of the abutment forces over the abutment surface, i.e., more even (and thus lower) contact pressures, helping minimize brake pad vibrations and associated brake noise, improved fatigue life performance and reduce component wear.

In addition, the arrangements can help in reducing the effects of "pad kick," an in-place rotation of the brake pad that can generate undesired brake application noise due to pad vibrations, increase fatigue damage to typical brake pad retaining hardware (e.g., over-pad leaf springs) and increase wear and damage to the brake pad and/or brake caliper mounting structure. An illustration of pad kick is provided in FIG. 4. When a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated). At the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifesting itself as a moderate-to-severe oscillation of the brake pad in its mount, significantly increasing wear of the abutting brake pad and mount surfaces.

One of ordinary skill in the art will recognize that the brake pad support function may be provided by a brake caliper mount designed to support the brake pads, or by a brake pad carrier which is separate from the caliper mounting structure. For convenience in this description, the terms caliper carrier, caliper mount and brake pad carrier may be interchanged without intending to limit the brake par supporting structure to any specific brake pad and brake caliper carrying structure.

A further advantage of the present invention is that the reduced width in the radially inner region of the brake pad permits brake pad retention features, such as those disclosed in co-pending application Ser. No. 14/640,152, to be moved closer together to enable further reduction in the size of the disc brake components while maintaining a desired level of braking performance and/or or increasing braking performance by increasing brake pad lining surface area while still keeping overall brake size within the space-constrained envelope of the wheel rim and other nearby components.

Other objects, advantages and novel features of the present invention will become apparent from the following detailed description of the invention when considered in conjunction with the accompanying drawings.

DETAILED DESCRIPTION OF THE DRAWINGS

Figure 2:
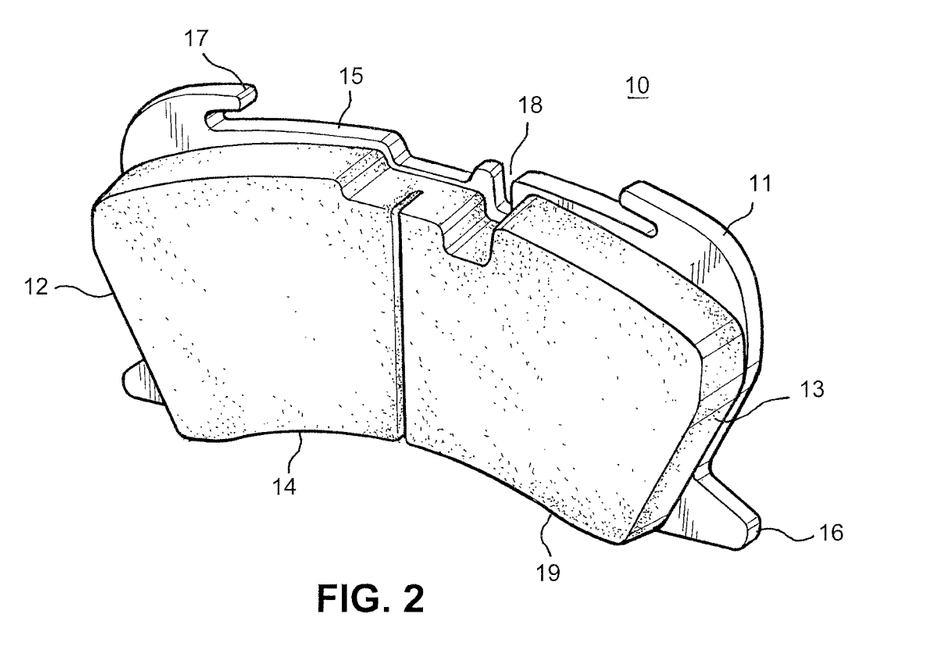
FIG. 2 is an oblique view of a brake pad in accordance with an embodiment of the present invention.
Figure 3:
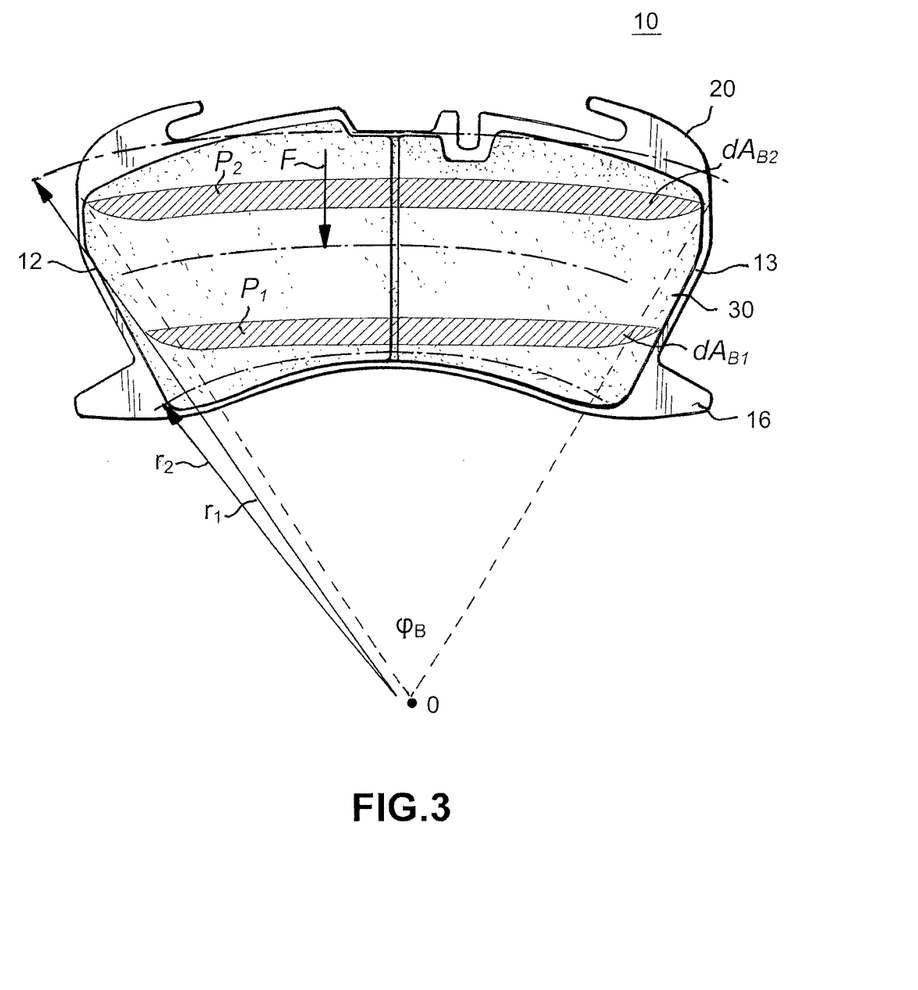
FIG. 3 is an elevation view of the brake pad in FIG. 2.

FIG. 2 is an oblique view of an embodiment of the present invention in which a brake pad 10 includes a backing plate 11 with brake pad friction material 19 affixed thereon. The lateral sides 12, 13 of the brake pad 10 are generally aligned, as shown in FIG. 3, along radii extending from the rotation axis of the brake disc 2 (not illustrated). The radially inner side 14 and the radially outer side 15 of the brake pad 10 are slightly curved, generally following the curvature of the brake disc.

The brake pad backing plate in this embodiment includes lateral projections 16 which are formed to engage corresponding brake pad retention features in the carrier mount 4 in the manner disclosed in co-pending application Ser. No. 14/640,152, such that even in the absence of any additional brake pad retention devices, once engaged in the carrier mount's receiving features the brake pad is positively retained within the disc brake. The backing plate 20 in this embodiment also includes radially outer features, including hook portions 17 suitable for receiving the ends of brake pad vibration suppression and/or reaction devices such as leaf springs (not illustrated), and a notch 18 configured to receive a brake wear sensor (not illustrated). The brake pad backing plate lateral projections, hook portions and wear sensor notch are features of this embodiment, but are not required by the present invention.

The advantages of the present invention's performance in terms of braking energy, brake application pressure and reduced brake pad material wear is illustrated with the aid of FIG. 3 and the following equations.

FIG. 3 is a schematic annotated elevation view of the FIG. 2 embodiment of the inventive brake pad. As shown in this figure, the angle spanned by the arc of the pad material 30, centered on the rotation axis O is of the brake disc $\varphi_B$. The inner and outer radii of the pad material are $r_1$ and $r_2$, respectively. The incremental area used in the integration calculations below over which pressure $P_1$ ($P_2$) is applied is $dA_{B1}$ ($dA_{B2}$).

Using this nomenclature, the energy transfer into brake pad from the brake disc in each incremental area dA is related as:

$$\frac{dE_1}{dA_{B1}} = \frac{dE_2}{dA_{B2}} \qquad [1]$$

where $dE_1 = \mu p_1 dA_{B1} r_1 \dot{\varphi} t$ and $dE_2 = \mu p_2 dA_{B2} r_2 \dot{\varphi} t$
The specific energy at any radius r is $$dE(r) = \mu r \dot{\varphi} t \frac{1}{\varphi_B} \int_{-\varphi_B/2}^{\varphi_B/2} p(r, \varphi) r d\varphi dr \qquad [2]$$

The incremental area is:

$$dA_s(r) = 2\pi r dr \qquad [3]$$

and therefore the specific energy transfer is $$\frac{dE(r)}{dA_S(r)} = \frac{2\mu}{\mu \dot{\varphi} t} \frac{r}{\varphi_B} \int_{-\varphi_B/2}^{\varphi_B/2} p(r, \varphi) r d\varphi = K \qquad [4]$$

where K is a constant.

It is known that the brake pad material wear rate and pressure applied between the brake disc and the pad material have a 1:1 relationship:

$$\Delta h = KPvt \quad [5]$$

where h is the pad wear, P is the applied pressure, k is the wear coefficient (material dependent) and v is velocity. Pressure and wear therefore have a direct relationship.

The pressure distribution function (and therefore the pad material wear) may be obtained from the specific energy transfer equation:

$$\hat{p} = \frac{2\pi}{\mu \dot{\varphi} t} \frac{dE(r)}{dA_S(r)} = \frac{1}{\varphi_B} \int_{-\varphi_B/2}^{\varphi_B/2} p(r, \varphi) r d\varphi = K \quad [6]$$

This relationship permits assessment of the relative change in wear performance between two brake pad shapes. Holding other variables constant, the pressure (and wear) ratio between two pad shapes is:

$$\frac{P_1}{P_2} = \frac{\varphi_{B2}}{\varphi_{B1}} \frac{\int_{-\varphi_B/2}^{\varphi_B/2} p(r_1, \varphi) r d\varphi}{\int_{-\varphi_B/2}^{\varphi_B/2} p(r_2, \varphi) r d\varphi} \quad [7]$$

In the case of a brake pad in accordance with the present invention, as compared to a generally rectangular brake pad with the same inner radial height and outer radial height, when both brake pads are being applied to generate the same amount of braking force, the inventive brake pad's greater arc length at the radially outer region of the brake pad results in generation of greater braking force at a lower local pressure as compared to a generally rectangular brake pad, while simultaneously decreasing the amount of braking force needed from the pad material at the radially inner region of the brake pad.

For example, in one comparison of an existing generally rectangular brake pad to the inventive brake pad shape, the inventive brake pad had a 20 cm greater arc length in the radially outer region of the brake disc (the arc angle $\varphi_B$ was approximately five degrees, as determined by the radius of the brake disc and the original arc length of the existing rectangular brake pad. Despite a 4% reduction in the overall brake pad surface area for the inventive "wedge" shaped brake pad, the re-distribution of brake application pressure and braking force resulting from the alteration of the distribution of the pad material along the radial height of the brake pad resulted in a reduction of the P1/P2 brake application pressure ratio reduction, while still obtaining the same braking force, of 1.31:1. In other words, despite the decrease in brake pad material area, with the inventive brake pad arrangements the wear rate was 31% lower than the existing generally rectangular brake pad. Depending on the needs of a particular disk brake application, the included angle and the upper and lower arc lengths may be adjusted to obtain higher or lower pressure ratios. For example, in a particularly space-constrained brake environment, the arc angle may be restricted such that the decrease in the pressure ratio and resulting improvement in friction material wear performance is limited, however, preferably the increase in wear performance exceeds 10%. Another variation may be the result of a difference in how the brake pressure is applied to the caliper piston-side of the backing plate, e.g., a compared to a caliper design having two adjacent pressure pistons, in an application in which the brake caliper has a single pressure piston and a friction material area 10% less than an equivalent parallel-sided brake pad, the increase in brake pad wear performance may be somewhat lower, for example 10% or less, due to the concentration of the brake application force to the center of the pad backing plate. The effect of the concentration of the brake application force to the center of the brake pad may be at least partially mitigated by providing a thicker backing plate.

Figure 5:
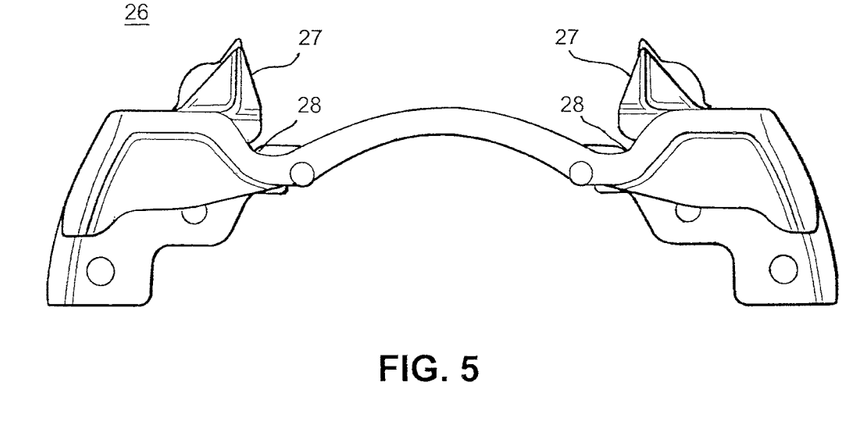
FIG. 5 is an elevation view of an embodiment of a carrier mount configured to complement the brake pad of FIG. 2.

FIG. 5 is an elevation view of a preferred carrier mount 26 configured to complement the brake pad of FIG. 2, having carrier mount brake pad abutment surfaces 27 configured to support the brake pad 10 in the circumferential direction in response to braking reaction forces generated between the brake disc and the brake pads. This is a preferred embodiment, however it is not necessary to change the carrier to obtain many of the benefits of the present invention. As a result of the lateral sides 12, 13 of the brake pad 10 (and hence the pad abutments surfaces 27) being generally aligned along radii extending from the brake disc rotation axis, the transfer of braking forces between the trailing edge of the brake pad 10 and the carrier mount 26 occurs substantially parallel to the tangential direction of the brake disc rotation (i.e., across a surface that is perpendicular to the rotation direction), thereby minimizing forces tending to shift the trailing edge of brake pad radially outward relative to its adjacent carrier mount abutment surface 27. FIG. 5 also shows this carrier mount embodiment's brake pad lateral projection receiving features 28, complementarily shaped to receive brake pad 10's lateral projections 16 to positively retain the brake pad within the disc brake.

Figure 6:
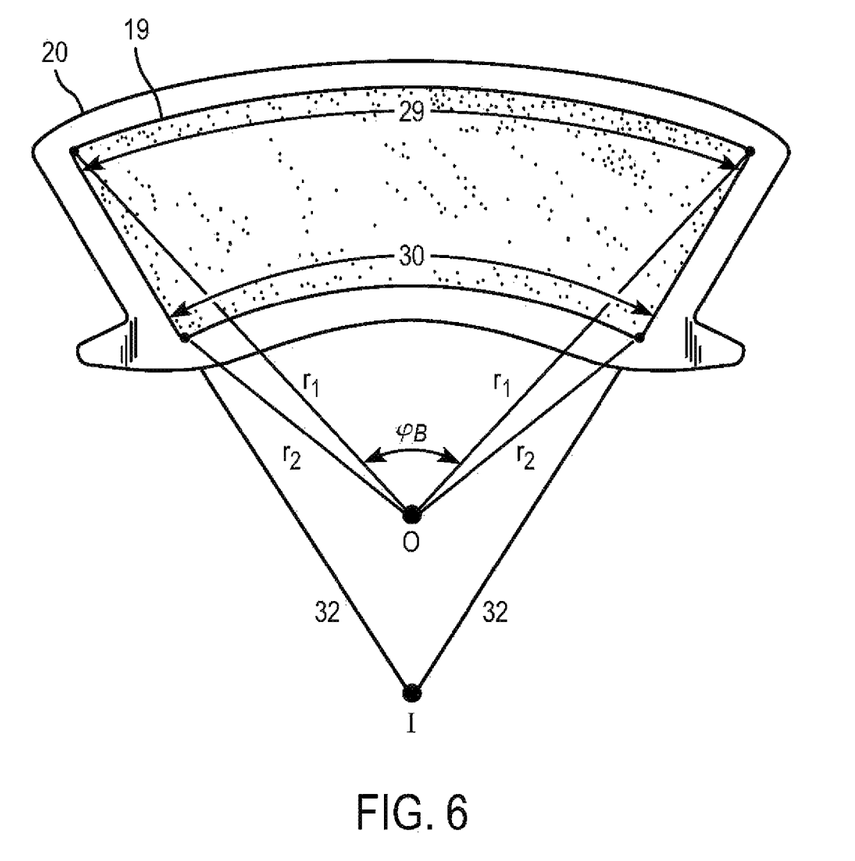
FIG. 6 is an elevation view of an alternative embodiment of a brake pad in accordance with the present invention.

FIG. 6 shows an elevation view of an alternative embodiment of the brake pad of the present invention, in which the brake pad friction material 19 has a generally arc-shaped profile, but the relatively long arc length 29 of the upper region of the pad friction material relative to the radial height of the brake pad results in the friction material lower region arc length 31 at radius $r_2$ extending laterally notably farther beyond the radii $r_1$ from the rotation axis O to the lateral ends of upper arc length 29. In this embodiment the brake pad friction material's upper region arc length is 250 mm, corresponding to an included angle from the rotation axis O of the brake disc $\varphi_B$ of 72°, while the lower region arc length, at 150 mm, extends laterally beyond the radii of the included angle. In this case, where the friction material's lower region arc length 31 extends beyond the radii $r_1$ from the ends of the upper region arc length 29 to the rotation axis O, lines 32 extending from the non-parallel lateral sides of the brake pad friction material do not intersect at the rotation axis O, but instead intersect at a location I on the far side of the rotation axis O. Thus, in the present invention the lower region arc length need not exactly correspond to the radii from the rotation axis O to the ends of the upper region arc length, as long as a majority of the friction material is located in the radially upper region of the brake pad in order to provide the benefits of increased torque generation in the upper region and lower overall brake pad wear.

Figure 7:
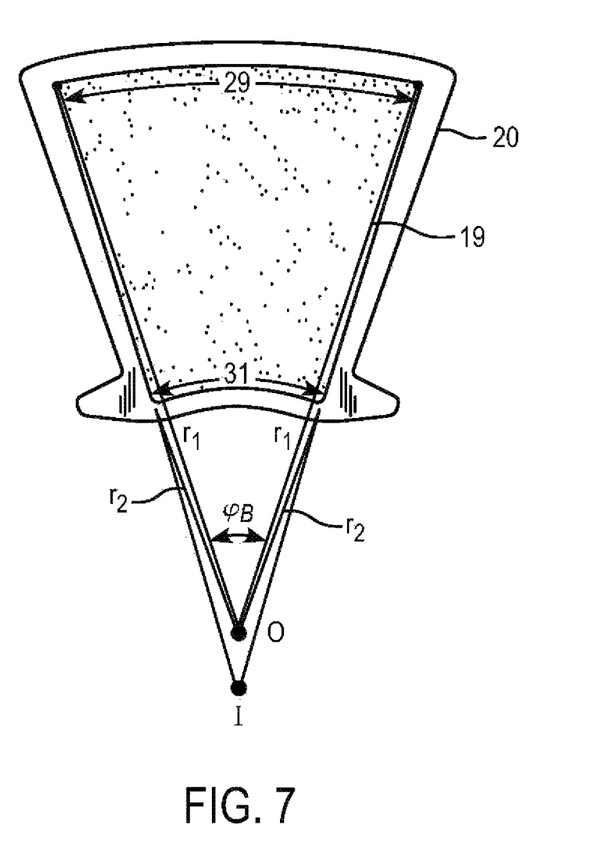
FIG. 7 is an elevation view of a further embodiment of a brake pad in accordance with the present invention.

FIG. 7 similarly shows an elevation view of a further embodiment in which the generally arc-shaped profile has a relatively short long upper region arc length 29 relative to the radial height of the brake pad of 104 mm, with the included angle $\varphi_B$ between radii $r_1$ being 30°. The lower region arc length 31 of this embodiment is 62.4 mm, resulting in the lateral sides of the friction material being located with the lateral ends of the lower region arc length 31 being closer to the radial lines than in the FIG. 6 embodiment.

While substantial portions of the lateral side of the brake pad are parallel to the adjacent faces of the brake pad carrier, relatively small portions of the arc length of the friction material may vary as desired for a specific application. For example, in the radially outer region the friction material may follow the brake pad backing plate laterally beyond the substantially linear side of the brake pad, for example, along a laterally-extending pad guidance tab (thereby providing an even larger amount of friction material at the outermost region of the brake pad). Alternatively, the radially-outer region of the backing plate and friction material may be "cropped," i.e., turning inward from the substantially linear sides of the brake pad, to ensure the overall width of the brake pad is not too wide to be inserted into the pad carrier in a particular brake application.

In all of the embodiments, the present invention's approach remains of "shifting material" from the radially inner region of the brake pad to its radially outer region in order to more effectively and evenly use the friction material where it will be more effective during braking. For example, an embodiment may have an upper region arc length, included angle and lower region arc length between those of the FIGS. 6-7 examples, such as a 60° pad with upper and lower arc lengths of 210 mm and 126 mm, respectively. Preferably the included angle is 30° to 75°, and especially preferably is 50° to 60°.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 disc brake
2 brake disc
3 brake caliper
4 carrier mount
5 caliper actuator mounting face
6 brake pads
10 brake pad
11 brake pad backing plate
12, 13 brake pad lateral sides
14 brake pad radially inner side
15 brake pad radially outer side
16 backing plate lateral projections
17 radially outer retaining hooks
18 radially outer pad wear sensor notch
19 brake pad friction material
20 brake pad
22, 23 brake pad lateral sides
24 brake pad radially inner side
25 brake pad radially outer side
26 carrier mount
27 carrier mount brake pad abutment surfaces
28 carrier mount brake pad lateral projection receiving features
29 friction material upper region arc length
30 friction material arc length
31 friction material lower region arc length
32 lines extending from non-parallel friction material lateral side
101 brake pad
102 brake pad leading edge
103 brake pad trailing edge

What is claimed is:

1. A brake pad of a commercial vehicle disk brake, comprising:
a brake pad backing plate and a brake pad friction material affixed to the backing plate,
wherein
the brake pad friction material has a radial height, non-parallel lateral sides and arc lengths in a circumferential direction of the brake disc that are larger at a radially outer side of the brake pad than at a radially inner side of the brake pad,
lines extending from each of the non-parallel friction material lateral sides intersect one another at an included angle which is smaller than an included angle between lines extending from circumferential ends of the radially outer side of the brake pad to a rotation axis of the disk brake,
the brake pad friction material has a friction surface area less than or equal to a friction surface area of a friction material of a brake pad having parallel lateral sides, the same radial height, and a radially outer side arc length that is less than or equal to the arc length of the radially outer side of the non-parallel side brake pad friction material, and
at a same rate of energy absorption during a braking event, a brake application pressure applied to the non-parallel side brake pad friction material is lower than a brake application pressure of the parallel side brake pad friction material.

2. The brake pad of claim 1, wherein
the brake pad friction material non-parallel lateral sides each include a linear side portion, and
the lines extend along a respective one of the linear side portions.

3. The brake pad of claim 2, wherein
a pressure ratio between the brake application pressure of the brake pad friction material having parallel lateral sides and the brake application pressure of the brake pad friction material having non-parallel lateral sides is at least 1.1:1.

4. The brake pad of claim 3, wherein
the pressure ratio is at least 1.3:1.

5. The brake pad according to claim 1, wherein
the brake pad backing plate includes brake pad retention features projecting laterally from the brake pad lateral sides configured to cooperate with brake pad retention feature receiving features of complementarily-shaped brake pad abutment surfaces of a brake pad carrier mount when the brake pad is in an installed position in the disk brake to retain the brake pad in the disk brake during brake operation, and
the brake pad retention features project laterally from the lateral sides of the brake pad backing plate no further than a maximum lateral extent of the brake pad backing plate in a radially outer region, the maximum lateral extent not including a laterally-projecting portion of the brake pad retaining features.

6. A commercial vehicle disc brake, comprising:
a brake caliper;
a brake pad including a brake pad backing plate and a brake pad friction material affixed to the backing plate, and
a carrier mount having brake pad abutment surfaces configured to receive the brake pad, wherein
- the brake pad friction material has a radial height, non-parallel lateral sides and arc lengths in a circumferential direction of the brake disc that are larger at a radially outer side of the brake pad than at a radially inner side of the brake pad,
- lines extending from each of the non-parallel friction material lateral sides intersect one another at an included angle which is smaller than an included angle between lines extending from circumferential ends of the radially outer side of the brake pad to a rotation axis of the disk brake,
- the brake pad friction material has a friction surface area less than or equal to a friction surface area of a friction material of a brake pad having parallel lateral sides, the same radial height, and a radially outer side arc length that is less than or equal to the arc length of the radially outer side of the non-parallel side brake pad friction material, and
- at a same rate of energy absorption during a braking event, a brake application pressure applied to the non-parallel side brake pad friction material is lower than a brake application pressure of the parallel side brake pad friction material.

7. The disk brake according to claim 6, wherein
the lines extending from each friction material lateral side linear portion intersect one another in a region on a side of a rotation axis of the brake disk opposite a side of the rotation axis facing the brake pad.

8. The disc brake according to claim 7, wherein
- the friction material non-parallel lateral sides each have a linear portion,
- when the brake pad is in an installed position in the disc brake, lines extending from each friction material lateral side linear portion intersect one another in a region radially inside a friction surface of the brake disk.

9. The disk brake according to claim 8, wherein
an included angle between the friction material lateral side linear portions is between 30° and 75° inclusive.

10. The disk brake according to claim 9, wherein
the included angle is between 50° and 60° inclusive.

11. The disk brake according to claim 6, wherein
- the brake pad backing plate non-parallel lateral sides include brake pad retention features projecting laterally from the brake pad lateral sides,
- the carrier mount brake pad abutment surfaces are configured with a shape that complements a shape of the brake pad backing plate lateral sides and include brake pad retention feature receiving features,
- the brake pad retention features project laterally from the lateral sides of the brake pad backing plate no further than a maximum lateral extent of the brake pad backing plate in a radially outer region, the maximum lateral extent not including a laterally-projecting portion of the brake pad retaining features.

12. A brake pad of a disk brake, comprising:
a brake pad backing plate and a brake pad friction material affixed to the backing plate,
wherein
- the brake pad friction material has a radial height, non-parallel lateral sides and arc lengths in a circumferential direction of the brake disc that are larger at a radially outer side of the brake pad than at a radially inner side of the brake pad,
- lines extending from each of the non-parallel friction material lateral sides intersect one another at an included angle which is smaller than an included angle between lines extending from circumferential ends of the radially outer side of the brake pad to a rotation axis of the disk brake,
- the brake pad friction material has a friction surface area less than or equal to a friction surface area of a friction material of a brake pad having parallel lateral sides, the same radial height, and a radially outer side arc length that is less than or equal to the arc length of the radially outer side of the non-parallel side brake pad friction material, and
- at a same rate of energy absorption during a braking event, a brake application pressure applied to the non-parallel side brake pad friction material is lower than a brake application pressure of the parallel side brake pad friction material.

13. The brake pad of claim 12, wherein
a pressure ratio between the brake application pressure of the brake pad friction material having parallel lateral sides and the brake application pressure of the brake pad friction material having non-parallel lateral sides is at least 1.1:1.

14. The brake pad of claim 13, wherein
the pressure ratio is at least 1.3:1.

15. The brake pad according to claim 12, wherein
- the brake pad backing plate includes brake pad retention features projecting laterally from the brake pad lateral sides configured to cooperate with brake pad retention feature receiving features of complementarily-shaped brake pad abutment surfaces of a brake pad carrier mount when the brake pad is in an installed position in the disk brake to retain the brake pad in the disk brake during brake operation, and
- the brake pad retention features project laterally from the lateral sides of the brake pad backing plate no further than a maximum lateral extent of the brake pad backing plate in a radially outer region, the maximum lateral extent not including a laterally-projecting portion of the brake pad retaining features.

* * * * *